Jan. 19, 1965   W. R. LYNCH   3,165,793
FLANGE-GRIPPING FLEXIBLE SEALING-STRIP CARRIER
Filed June 5, 1961   10 Sheets-Sheet 1

INVENTOR.
WILLIAM R. LYNCH
BY
Justin C. Macklin,
ATTORNEY

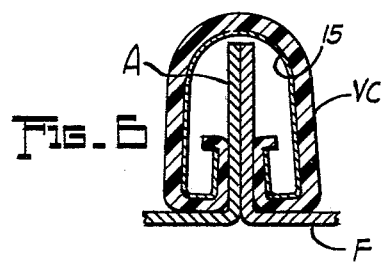
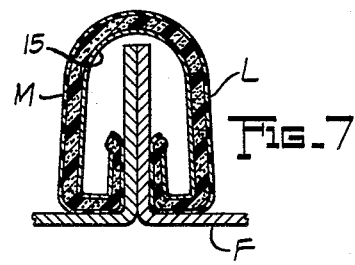
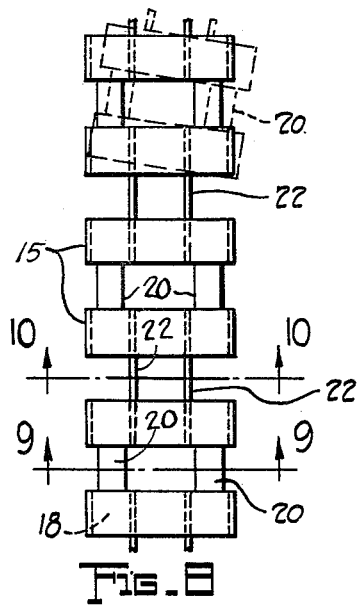
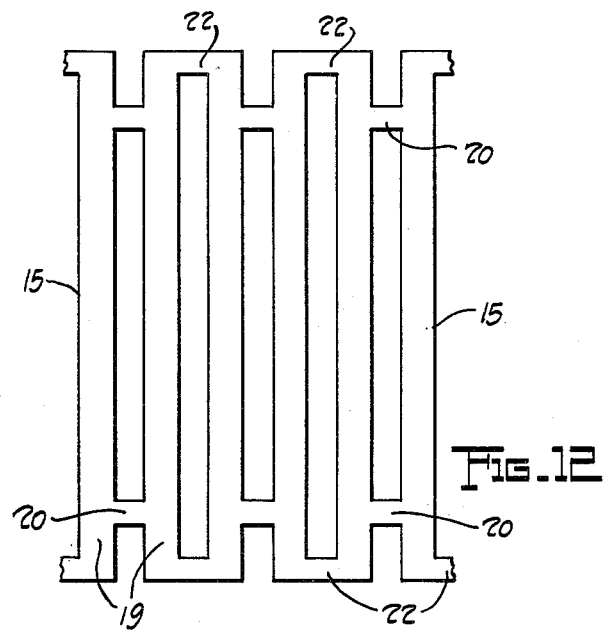
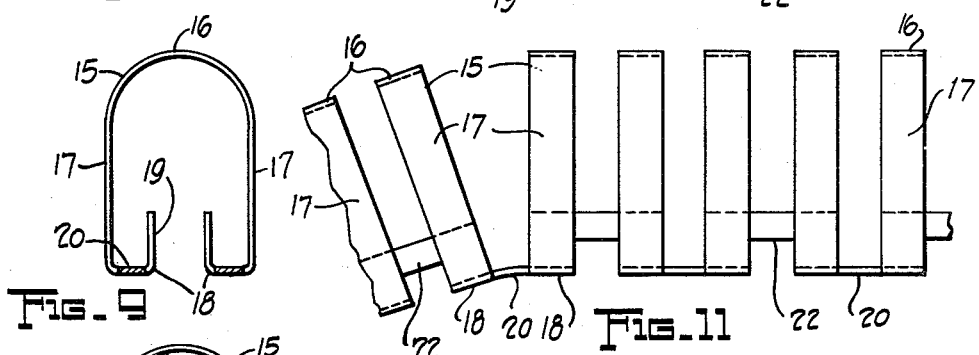
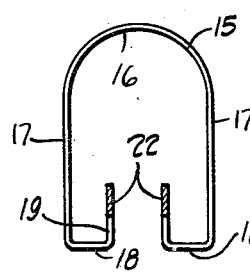
INVENTOR.
WILLIAM R. LYNCH
BY
ATTORNEY.

INVENTOR.
WILLIAM R. LYNCH

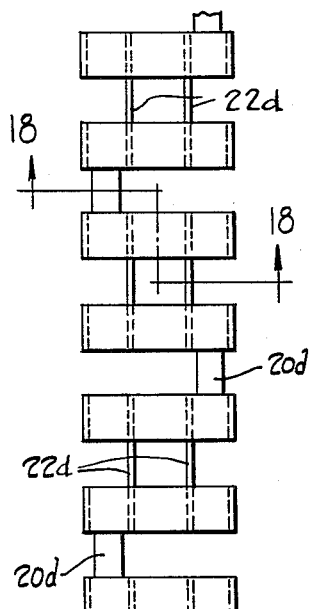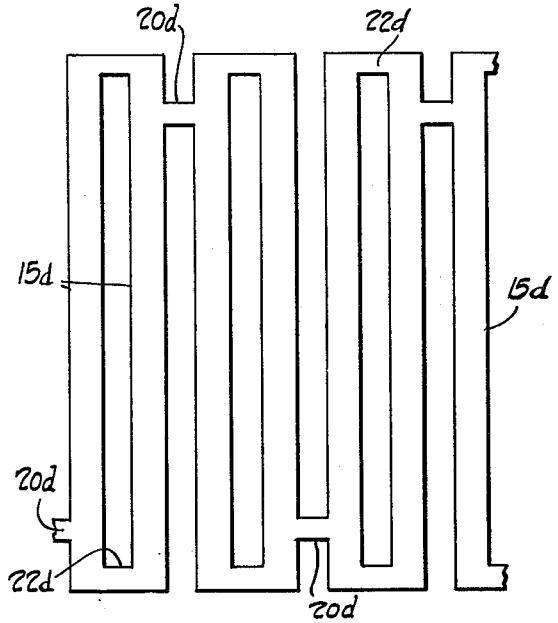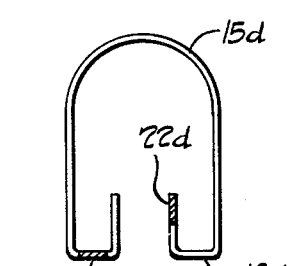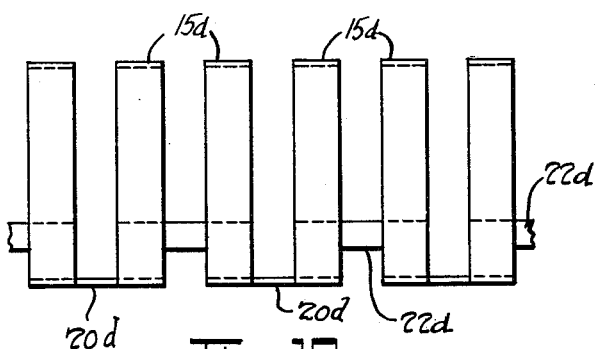

Jan. 19, 1965     W. R. LYNCH     3,165,793
FLANGE-GRIPPING FLEXIBLE SEALING-STRIP CARRIER
Filed June 5, 1961     10 Sheets-Sheet 5

INVENTOR.
WILLIAM R. LYNCH
BY
Justin W. Macklin
ATTORNEY.

INVENTOR.
WILLIAM R. LYNCH
BY
ATTORNEY

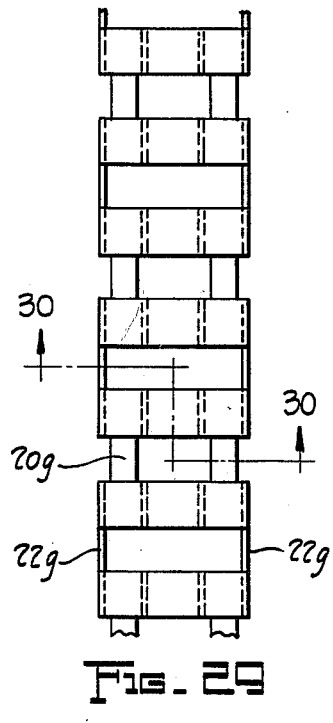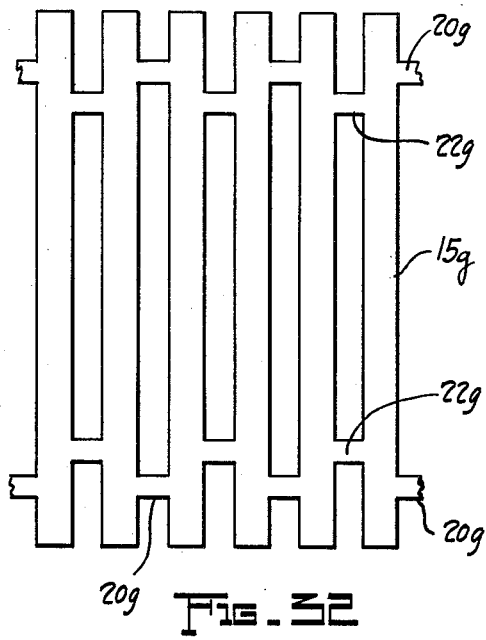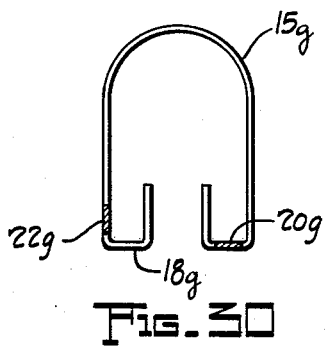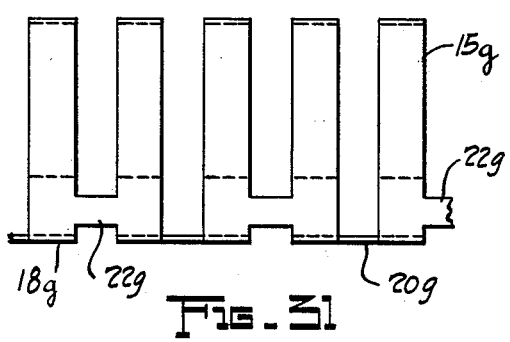

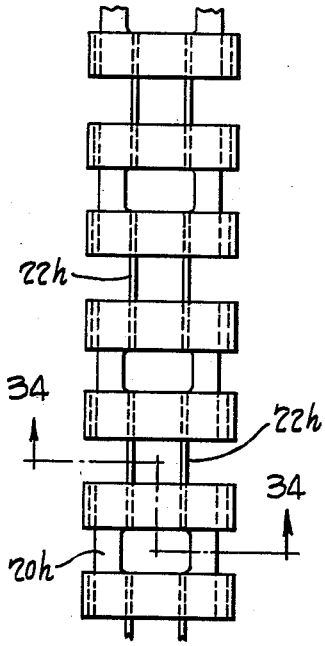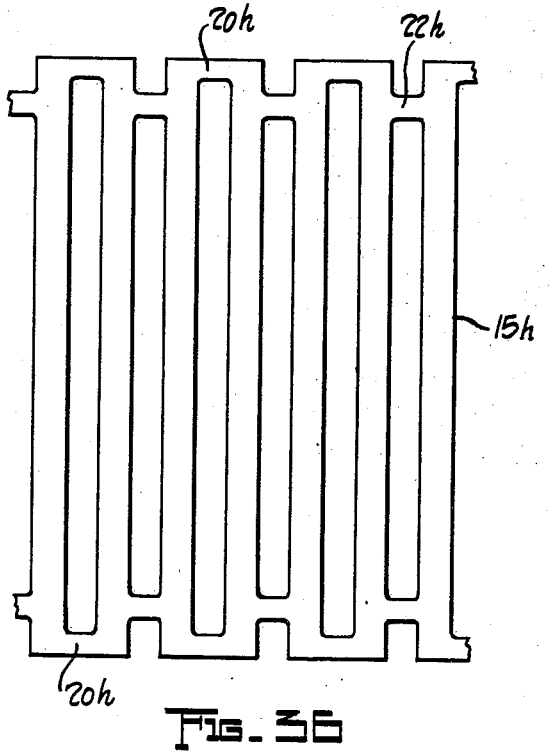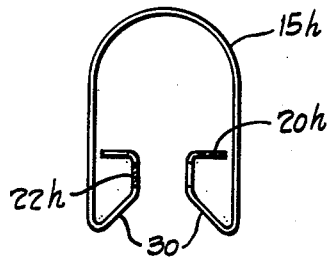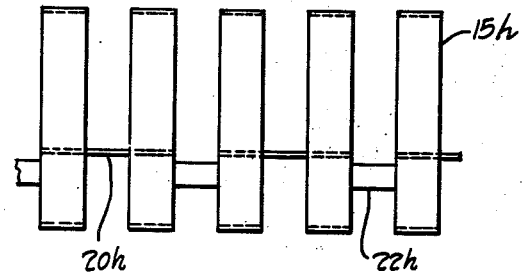

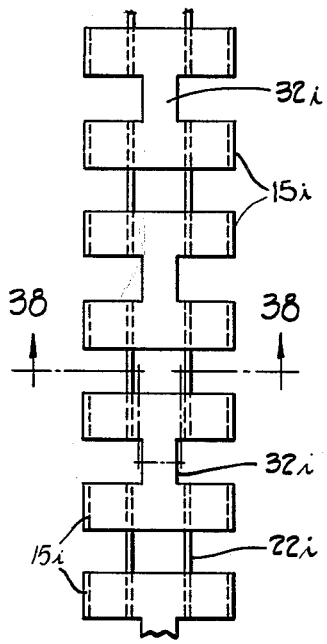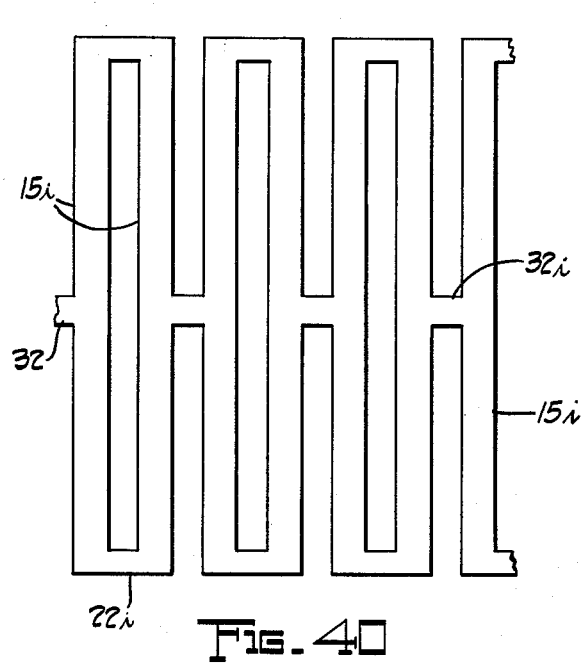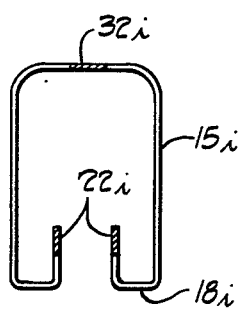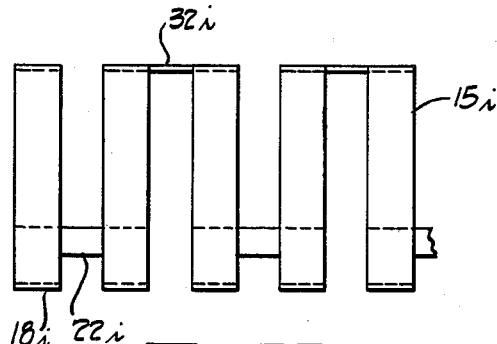

Jan. 19, 1965  W. R. LYNCH  3,165,793
FLANGE-GRIPPING FLEXIBLE SEALING-STRIP CARRIER
Filed June 5, 1961  10 Sheets-Sheet 10

INVENTOR.
WILLIAM R. LYNCH
BY
ATTORNEY.

United States Patent Office 3,165,793
Patented Jan. 19, 1965

3,165,793
FLANGE-GRIPPING FLEXIBLE SEALING-
STRIP CARRIER
William R. Lynch, Birmingham, Mich., assignor to Republic Industrial Corporation, Newark, N.J., a corporation of Delaware
Filed June 5, 1961, Ser. No. 114,732
16 Claims. (Cl. 20—69)

This invention is concerned with a novel flexible, resilient channel section carrying thereon windlace trim, weatherstrip seals, draft-excluding strip and the like, and for supporting the same securely upon a flange or like element.

Objects of the present invention include the provision of a unit assembly of specially shaped resilient sealing trim, or weather strips combined with the present novel carrying and securing means.

Flexible channel section carriers of the general type to which the present invention is related are commonly employed in attaching trim or weather strip to the doors or door frames of automobiles, and the accomplishment of this function in an improved manner is an important object of the present invention. While the present carrier is particularly adapted for such uses, obviously it may be employed for securing sealing strips in door and window openings of other structures.

In connection with the installation of automobile doors, it is desirable to seal the door against leakage while providing a decorative trim which, in addition, may compensate for and render unnoticeable any misalignments between the door and frame.

Previously, these functions have been performed by two or more separate pieces—one being a seal of rubber surrounding the door frame and connected thereto by adhesives, and the other being a wind cord. In such cases, the door closes on the rubber seal, which functions to prevent leakage, while the wind cord, visible from within the car, adds to this function and serves to hide the closure space between the door and frame.

It has been a common practice to provide a metal flange around the door frame and to support the combination seal and decorative trim by that flange. To accomplish this end, U-section clips having tangs or teeth positioned to bite into the flange have been developed and used, and such clips were disposed at spaced points along the seal or trim and positioned to straddle and grip the door frame flange in order to support the seal or trim in position.

Continuous flexible channel section is also known and used for this purpose, but here again, barbs, tangs or flanges interlocking with projections have been provided to keep the carrying section in position straddling the flange.

Certain difficulties, however, have been encountered in the use of any of these prior devices, arising from the fact that the flanges, even in one structure, are often of different thickness, and the plane of the flanges sometimes is rather abruptly offset or adjacent portions are out of alignment with the common plane of the flange.

In the case of the thickness of the flange being greater than that for which the gripping metal clip or the like is designed, it may exceed the elastic limit of the metal, or if the flange is too thin, insufficient gripping action results.

In the case of longitudinal misalignment of the holding flange from a common plane, the continuous types of carrier previously used are not suitable if any such lateral offsetting is too abrupt.

It is an object of the present invention to overcome the foregoing and various other disadvantages and to provide a simple structure which may be cheaply manufactured in quantities and which will be effective in use, particularly in that it may reliably carry and support both decorative and sealing trim.

Specifically, a very important object is to provide such a carrying gripping channel section which is capable of being bent on very short radii to fit into comparatively sharp corners without unsightly distortion of the trim carried thereby, and which, likewise, is capable of being laterally offset from its longitudinal direction without unduly straining the metal comprising the carrier or lessening its gripping action.

In order to accomplish the sharp bending without injury to the channel carrying structure, I have devised such a structure which essentially comprises a series of connected U-shaped gripping elements each having inwardly extending portions normally at right angles to the flange and further inturned, gripping portions parallel with the supporting flange. A novel feature is that the connections between the gripping elements are flat portions of the same thickness as that of the material. Preferably at alternate points of connection of the U-shaped gripping members the flat intervening connections may be at right angles to the flange to be embraced and those between are parallel with the surface of the flange.

Normally it is desirable that each of the pairs connected by parallel ribbon bridges shall be relatively inextensible while a length of the carrier may bend easily in one direction, generally in the plane of the opening around which the trim is to be mounted. The carrier channel may also be bent sharply about the connecting ribbon bridge portions, which are normally parallel to the surface of the flange. In both instances, the bending may be effected without distortion, injury or impairment of the gripping action.

It is also desirable in some instances to permit a slight degree of extensibility of the carrier channel, and a special arrangement of single connections positioned alternately at right angles to similar connections at the opposite ends of the channel permits some longitudinal extension.

Further objects o fthe invention may be stated to be the providing of strong, reliable channel-carrying section free from barbs and, consequently, relatively free from limitation in respect to the angle of attack or bite of such barbs, and yet which shall, in all instances, so strongly grip the flange as to satisfactory securely hold the trim in position.

Special arrangements of economical, effective and artistic covering or windlace carried by the channel may be combined with and be readily applied and permanently secured to a supporting flange, or the like.

Other objects and advantages of the present invention will become apparent from the following detailed description of preferred embodiments and alternate forms of the invention, reference being had to the accompanying drawings.

In the drawings:

FIG. 6 is a section similar to that of FIG. 2, showing a modified form of the trim with a cover, such as vinyl, in position on the carrier and flange;

FIG. 7 is a similar section, in which the carrier is covered by a porous, resilient backing, such as latex having a decorative fabric windlace covering;

FIG. 8 is a plan view of a portion of the carrier element, also showing in broken lines a bending action of one part with relation to the other (flexing a pair of parallel ribbon bridge connections) and in a direction laterally of the medial plane of the U-shaped elements;

FIG. 9 is a transverse sectional view on the same scale, taken between two of the U-shaped clamping elements, as indicated by the line 9—9 of FIG. 8;

FIG. 10 is a similar sectional view, taken between the next alternate pair of U-shaped gripping elements, as indicated by line 10—10 of FIG. 8;

FIG. 11 is a fragmentary view of a number of the U-shaped clamping elements and indicating a bend between two adjacent gripping elements in a direction flexing the connections appearing in section in FIG. 9;

FIG. 12 is a plan view of a short portion of the blank from which the form shown particularly in FIGS. 3 and 8 to 11 is formed;

Figure 13:
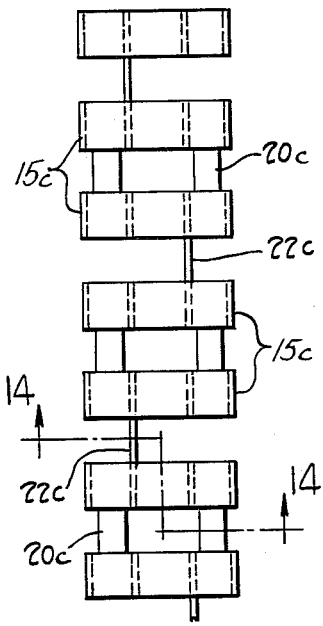
FIG. 13 is a plan view of a portion of the length of a carrier channel constructed in a slightly modified form and in which, between alternate pairs of U-shaped members, there is formed only one connecting bridge element instead of two, as in the form of FIGS. 8–12.
Figure 14:
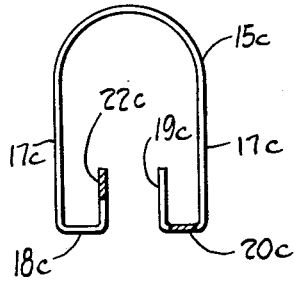
FIG. 14 is a sectional view, taken on an offset plane indicated by the offset lines 14—14 of FIG. 13.
Figure 15:
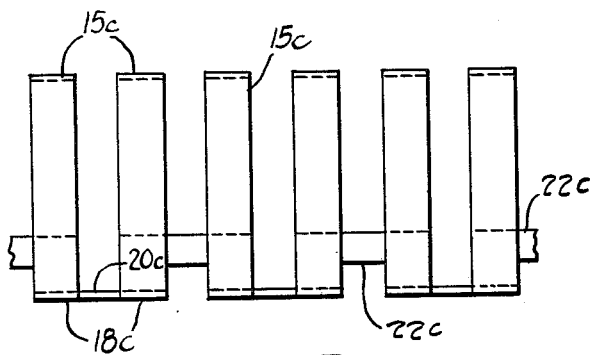
FIG. 15 is a side elevation of the carrier channel shown in FIGS. 13 and 14.
Figure 21:
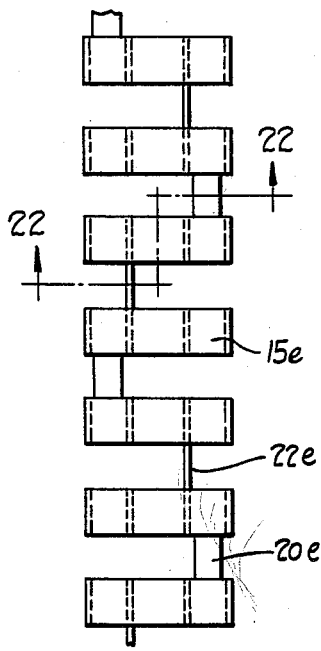
Figure 24:
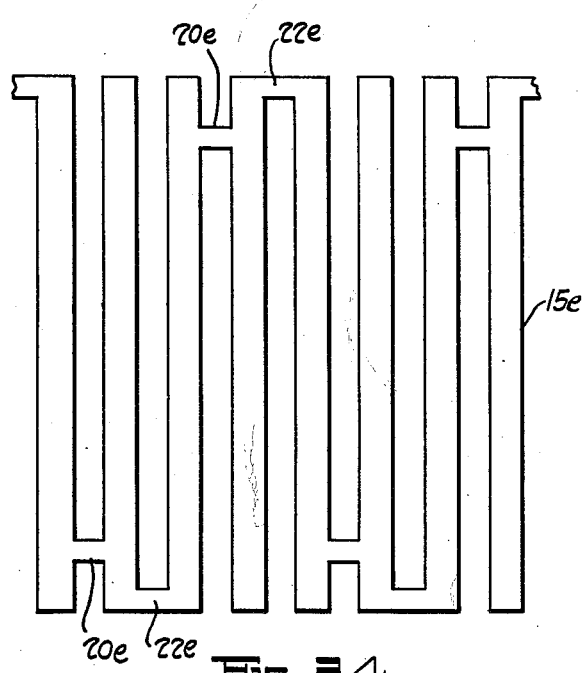
Figure 22:
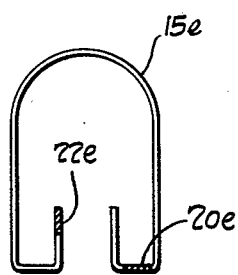
Figure 23:
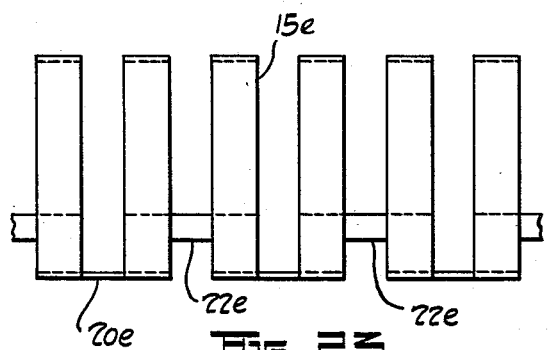

FIGS. 17, 18 and 19 are view similar to FIGS. 13, 14 and 15 showing a modified form of the connections in which there are two bridging elements between alternate pairs of the U-shaped portions which are parallel with the central plane of these U-shaped clamping portions, i.e., parallel with the flange to be gripped, and there is only a single connection between alternate pairs of clamping members at right angles to the central plane;

FIG. 20 is a fragmentary plan view of the blank from which the carrier channel of this modification of FIGS. 17, 18 and 19 may be formed;

FIGS. 21, 22 and 23 correspond to FIGS. 17, 18 and 19, and illustrate still another slightly modified form in which the adjacent alternate pairs of U-shaped clamping members are connected by only a single bridging ribbon-like portion on alternate sides of the central plane, and which in turn lie in planes parallel to the flange to be gripped and alternately at opposite sides thereof;

FIG. 24 is a fragmentary plan of the blank from which the modification of FIGS. 21, 22 and 23 is formed;

FIGS. 25, 26, 27 and 28 illustrate another slightly modified form, being a plan view, a section on the offset plane shown by lines 26—26, a side elevation and the blank, respectively;

FIGS. 29–32 similarly illustrate still another modification of the connections between pairs of the U-shaped clamping members, again constituting a plan, offset section, side elevation and the blank;

FIGS. 33–36 are a plan, offset section, side elevation and blank, respectively, of still another arrangement of the connections between the alternate pairs of U-shaped gripping members, and having a flared throat;

FIGS. 37, 38, 39 and 40 again constitute a plan, offset section, side elevation and blank of still another form, this latter form showing alternate connections between pairs of the U-shaped clamping members at the arch or mid-portion of these members;

FIGS. 41, 42, 43 and 44 illustrate still another modification in which alternate connections are made at the arch or mid-portions of the U-shaped clamping members, and the sides of pairs, these views, as before, being a plan, offset section, side elevation and blank, respectively.

From the foregoing description of views, it will be apparent that there are illustrated a number of modifications, all of which, however, have in common ribbon-like bridging connections between alternate pairs of adjacent U-shaped clamping members. It will also be noted that the planes of the bridging members are positioned alternately at right angles to adjacent ribbon-like connections. In each case, the result is that the channel-carrying clamping means may be bent or curved in either of two directions with respect to its length, in each case flexing ribbon-like connections across their flat or thin dimension.

According to the present specifications and customer acceptability, particularly in the automobile trade, a preferred form embodying the basic principles of my present invention, and which is very effective in meeting the variety of conditions of fitting sharp corners, adapting to lateral bends and the like, while serving to securely retain the sealing and decorative trim, is that shown in FIGS. 3 and 8–12.

This form embodies the basic idea and principles of construction common to the several modified forms illustrated in the subsequent FIGS. 13–44. Accordingly, it will be first described in connection with the associated illustrations of FIGS. 1, 2, and 3.

Figure 1:
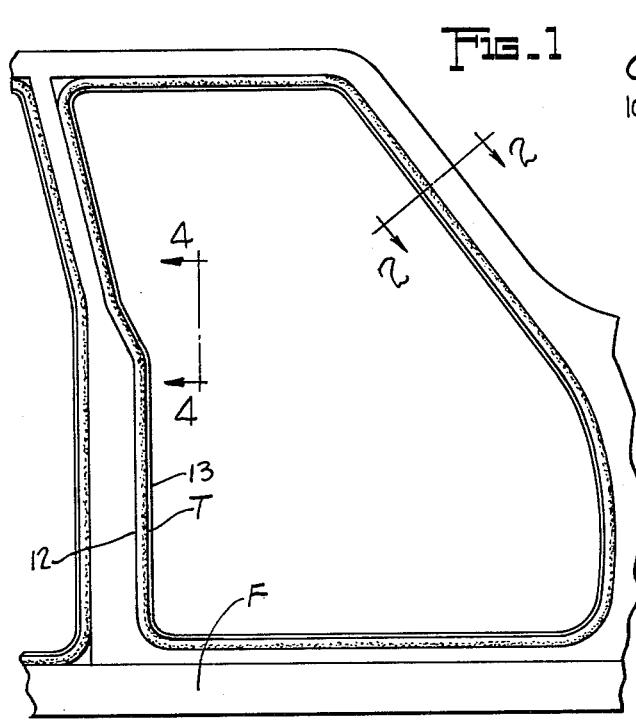
FIG. 1 is a side elevation of an automobile door frame equipped with a combination carrier, trim and seal, in accordance witht the teachings of the present invention.
Figure 2:
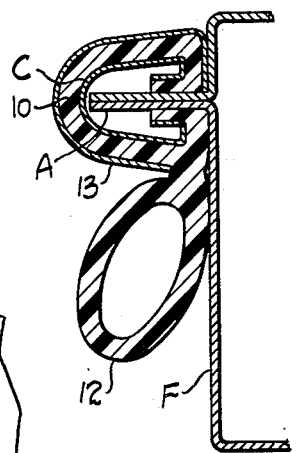
FIG. 2 is an enlarged cross section on a plane which may be located as indicated by the line 2—2 of FIG. 1.
Figures 3, 5:
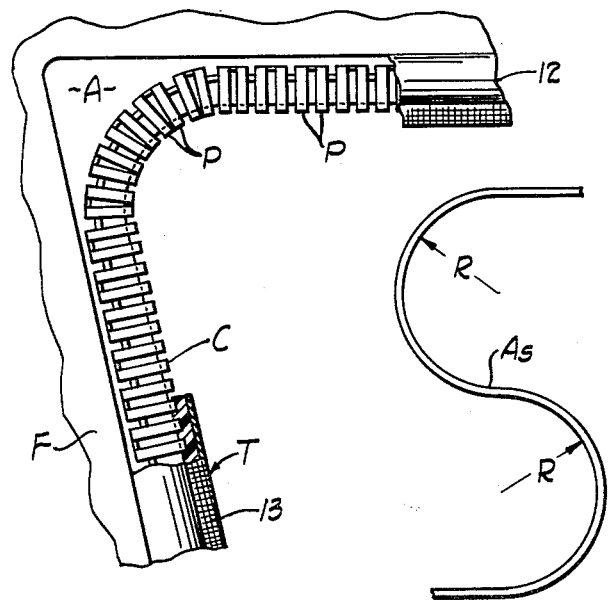
FIG. 3 is a view in elevation on a enlarged scale, illustrating the corner arrangement as appears at the upper left portion of the door frame shown in FIG. 1, portions of the covering of the carrier channel being removed in order to more clearly illustrate how the carrier accommodates itself to a short radius of curvature or a relatively sharp corner.
FIG. 5 is an edge view showing a reverse curve shape of a flange and illustrating an extreme condition to which the carrier channel with the seal and trim thereon may be subjected.

In FIGS. 1, 2 and 3, F indicates the frame portion of an automobile surrounding the door opening. T generally indicates the trim which is secured to flanges around the door opening of the frame structure. In FIG. 2 the flange A is shown as composed of two laminae formed on the perimeter or edges of the sheet metal of the body around the frame. In some structures a portion of the flange A may be of one thickness of the metal, or three—or even more.

Straddling the flange A is a resilient flexible securing and carrying channel C constructed in accordance with the principles of the present invention. This carrier channel C is enveloped by a resilient, flexible material, such as rubber or plastic, which extends around the outer portion of the sections of the carrier channel and inwardly toward the flange, and then upwardly between the inner ends of the gripping portion, where it is pressed into tight holding engagement with the flange by the spring pressure of the U-shaped portions of the carrier channel.

The trim assembly T may comprise one or more continuous lengths fitted around the door opening.

As shown in FIG. 2, the rubber or plastic material 10 extending around the outside of the carrier channel and then inwardly and between gripping portions of the channel is provided with an integral, hollow, tubular type of sealing portion 12, preferably positioned to be engaged by a flange or offset of the automobile door when in its closed position.

Figure 4:
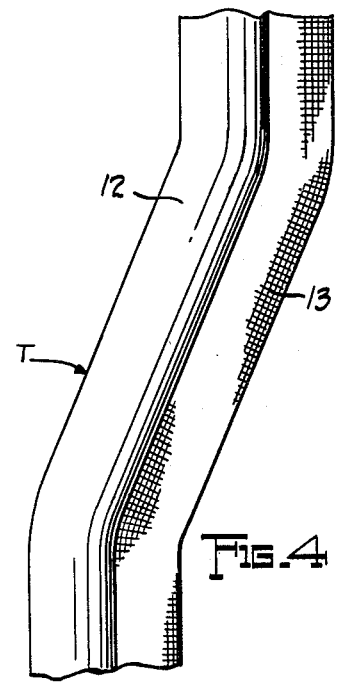
FIG. 4 is an enlarged elevation of a short portion of the channel and trim taken, for example, at the position indicated by the lines 4—4 of FIG. 1 and illustrating an abrupt longitudinal offset of which the carrying channel and trim are capable.

The portions around and over the outside of the channel may have a decorative covering material, indicated at 13 in FIGS. 2, 3, and 4.

In all of the forms shown, and herein described more in detail, there are the following common characteristics, namely, the carrier channel is made from a length of continuous strip; is cut and bent to form successive, evenly spaced, U-shaped clamping members, each constituting a gripping clip adapted to straddle and embrace the sides of a flange; and all of these U-shaped gripping elements are interconnected in the continuous length of the carrier channel. Each of the U-shaped gripping sections has an inwardly turned portion extending from each leg of the U-toward the central plane of the U, and gripping end portions turned again toward the middle or arch of the U and presenting flat surfaces gripping the weather strip or trim material between them and the flanges.

Further, a novel, important common characteristic is that successive adjacent U-shaped sections are connected by integral flat portions, some of which may bend in the general plane of the flange to be embraced and, thus, into or around sharp corners of the door frame flanges, the bending occurring at flat or thin bridging connections in one direction which are positioned at right angles to the plane of the flange. Bending transversely of the central plane of the U-sections is provided by similar flexibility of alternate flat connections which are normally parallel with this central plane, and with the normal plane of the flange.

As indicated, a preferred and desirable form which provides excellent adaptability to flanges of different widths and thickness, and wide suitability for supporting various sorts and types of weather stripping material, and which has the mechanical characteristics whereby this is attained, is the channel carrier construction illustrated in FIGS. 3 and 8–12 inclusive.

The U-shaped gripping sections 15 each comprise a section relatively short longitudinally of the carrier and which has the central arch or bend 16, parallel legs or sides 17, inwardly extending portions 18, and the gripping surface pads or ends 19 extending normally parallel to one another and in a direction toward the arch 16.

The U-shaped sections 15 are separated longitudinally of the strip, preferably a distance comparable to their width.

The inwardly extending portions 18 of a pair of adjacent U-sections are connected by integral bridging ribbons 20, shown in section in FIG. 9. Obviously, these bridging members lie in the same plane with the inturned sections 18 of the U-shaped portions, and are, of course, integral therewith. The next adjacent U-shaped sections are connected at their inwardly (upwardly) extending, parallel portions by similar bridging ribbons 22, as appears at the section line 10—10 of FIG. 8, and as shown in section in FIG. 10.

To form this carrier with adjacent U-shaped sections alternately interconnected by the bridging elements lying alternately in planes at right angles to each other, namely, normal to the flange and parallel to the flange, a suitable blank is first prepared. A short, fragmentary section of this blank is shown on an enlarged scale in FIG. 12. This is cut from a length of flat, thin, resilient material such as spring steel or other suitable metal. The strip from which the blank is formed has portions cut out, leaving the parts which, when bent to the configuration described, correspond to those previously designated by the same reference numerals. That is, the U-shaped portions 15 constitute parallel strips extending from side to side of the blanks. The portions 18 and connecting bridging portions 20 become aligned at right angles to the parallel sides of the U, while the aligned bridging members 20 remain in the same plane with the parts 18. The inwardly (upwardly) turned parallel gripping portions 19 are alternately connected by the bridging portions 22, as will be readily apparent from comparing the corresponding portions of the blank of FIG. 12 with those of FIGS. 8–11.

The material from which this blank is made, as indicated, should be resilient, and it is selected to meet the requirement that it has a property and capability of being expanded at the mouth of the U between the gripping sections 19 and 22 to about three times the normal opening of the throat shown in the positions of FIGS. 9 and 10. Here it may be noted that in the scale of these patent drawings, FIG. 3 shows the carrier approximately full size, while the scale of FIGS. 6 and 7 is substantially larger and the scale of FIGS. 8–12 is still further enlarged over the actual size of the commercial form of the carrier. For example, the width of the strip from which the blank is formed may be 1⅛ inches wide, being adapted for a wide variety of applications. The thickness of the strip may be five or ten one-thousandths of an inch, for example.

In the upper portion of FIG. 8, a pair of the U-shaped sections is shown in broken lines, in a relative lateral bending position. This bending action occurs substantially entirely at the parallel bridging members designated 22, while the flat bridging sections 20 between the two members illustrated in broken lines will have maintained substantially their normal connecting position.

In FIG. 11 at the left-hand portion of this side elevation an adjacent pair of the U-shaped members is shown as tipped at an angle with relation to those at the right, the bending occurring at the ribbon portions 20 connecting the inturned flats 18. Thus, in both instances, it is obvious that the unique characteristic of this carrier is the facility with which it may be bent in either of the directions described, and that the bending occurs at the connections affording the least resistance, namely, across the thin, flat, bridging portions.

An illustration of this bending around a very sharp, short radius corner is that of FIG. 3, and it will be noted that pairs of U-shaped members, designated P, connected by the bridging portions 22 remain in their substantially normal positions, i.e., spaced, while the bend occurring at the intermediate bridging sections 20 permits the pair of U-shaped members adjacent thereto to substantially touch at the arch portions. In practice, this avoids distortion or wrinkling of the covering material, and if the bending were in the opposite curvature, the relative position of alternate pairs in parallelism while the bend occurred at the flat, connecting bridge ribbons 20 would be the position illustrated at the left in FIG. 11.

The sinuous bending transversely of the central plane of the channel is often required by reason of offsets in the plane of the flanges, for example, at the zone indicated by the lines 4—4 of FIG. 1. The bending is in two directions, such as illustrated in the enlarged view 4—4 of FIG. 4. To accommodate such a bend, the connecting bridges 22 are bent across their thin dimension with a minimum disturbance of the U-shaped clamping members.

The S curvature shown in FIG. 5 is intended to illustrate an edge view of a flange as curved to represent an extreme condition, and the embodiment of my carrier channel and sealing trim is capable of being fitted onto a flange of such a curvature where the radius R of each curve is two inches or more.

Referring back to FIG. 6, the channel covering may comprise a vinyl material, designated VC, which extends around the carrier channel to the frame metal F, then inwardly beneath the portions 18 and 20 and upwardly between the pressure surface 19 and 22, and preferably slightly beyond, as there shown. In this position, it may be very firmly retained in its channel-embracing position while the trim assembly is firmly and very securely held on the flange. The surface of the vinyl cover may have suitable decorative trim formed thereon or applied thereto in any suitable manner.

In FIG. 7 the carrier is covered with a longitudinally extending trim seal constituting a porous or spongy backing, such as latex, indicated at L, and a fabric cover or windlace material M extends around and inwardly and between the gripping surfaces 19 and 22, as before. A preferred form of this covering constitutes a windlace having a thin or selvaged edge and decorative surface, and across substantially the entire width of the same is applied and secured a foamed latex deposit, which in use takes substantially the position and form shown in FIG. 7.

Obviously, many variations of the covering and seal may be used and effectively secured by the holding means, and its flexibility is preferably such that its surface will not be subjected to unsightly wrinkles when bent into sharp corners, while the materials of the trim and seal are sufficiently flexible to permit a reasonable degree of stretch where the curvature requires.

Figure 16:
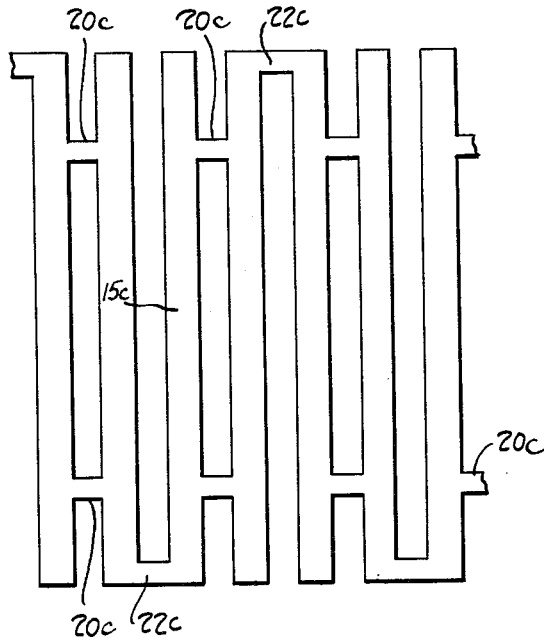
FIG. 16 is a plan view of a portion of the blank from which the embodiment of FIGS. 13–15 is formed.

In FIGS. 13–16 is illustrated another form which maintains the same characteristic of flexibility by bending across the thin dimension of the flat material of which the channel is formed, but in which lateral flexibility may be somewhat increased. In addition, this carrier channel is capable of a slight degree of longitudinal extension. The blank shown in FIG. 16 is cut from the continuous strip of resilient material as before and is bent into the conformation shown in FIGS. 13, 14 and 15. Here, the U-shaped sections 15 are spaced and shaped as before with the inturned portions 18 and connections 20, but this arrangement differs from that of the form first described, as may be readily noted by comparing FIG. 13 to FIG. 8.

In the form shown in FIGS. 13–16, it will be apparent from FIGS. 13 and 15 that successive U-shaped clamping members are connected by bridging ribbons 20c on the portion of the clamping members which is inturned at 18c in the plane normal to the medial plane and to the flange to be gripped. These pairs are connected by one bridging member, indicated at 22c, integral with adjacent end portions of the gripping members and parallel to the medial plane. At the other side of a pair this bridging member 22c connects the other ends of adjacent clamping elements at the opposite side of the medial plane.

Referring again to the blank for this arrangement shown in FIG. 16, it will be seen that adjacent strips 15c, corresponding to the pairs of gripping members shown in FIGS. 13 and 15, are obviously connected by two bridging members 20c. These correspond to the members 20 of the form illustrated in FIGS. 8–12. The connections 22c occur alternately at opposite ends of any selected pair of strips 15c, which are connected by the bridging members 20c. Opposite each single bridging member 22c the slotted portion of the blank is open, as there appears. This feature permits a slight elongation of the finished channel, of say five percent of a given length, without unduly distorting the gripping members between the alternate connections 22c.

A modification of this grouping of the U-shaped clamping elements, while alternately connecting pairs with a single ribbon-like connection, appears in FIGS. 17–20. Here, a pair of gripping elements 15d are shown as connected by two of the ribbon bridges 22d, while at alternate sides of the pair the single connections are formed at the flat, inturned portion 18d at right angles to the flange and central plane. Thus, at one side of the pair in FIG. 17 the single connection 20d appears at the right, and at the other side of this pair the corresponding connection 20d appears at the left. The transverse section of FIG. 18, being taken on the offset plane, shows one of the connections 20d and only one of the two parallel, upwardly inturned connections 22d. The blank of the FIG. 20 differs from that of FIG. 16 in that the ends of the strips 15d forming the U-shaped members of each pair are connected by portions which become the parallel gripping surface connections 22d. The successive connections 20d at the inturned portion are alternately positioned at opposite sides of the central plane, as appears.

The channel structure of FIGS. 21–24 shows an arrangement in which the omission of connections goes a step farther, and in which there is only one ribbon-like bridging connection 20e at the inturned part normal to the central plane and one ribbon connection 22e. These are alternating as shown particularly in FIG. 21, and formed at opposite sides of the blank, as appears in FIG. 24.

Figure 25:
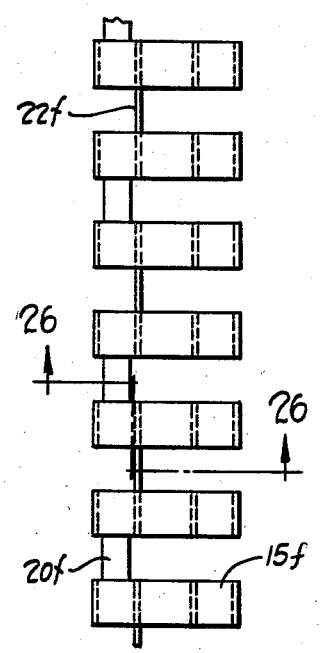
Figure 28:
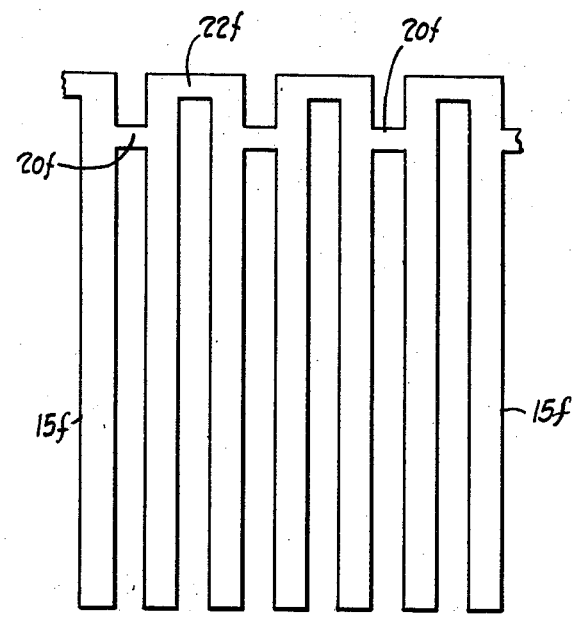
Figure 26:
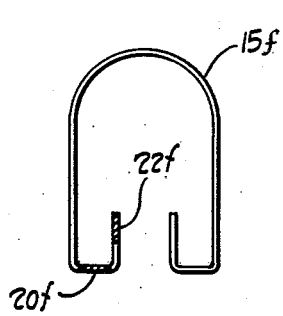
Figure 27:
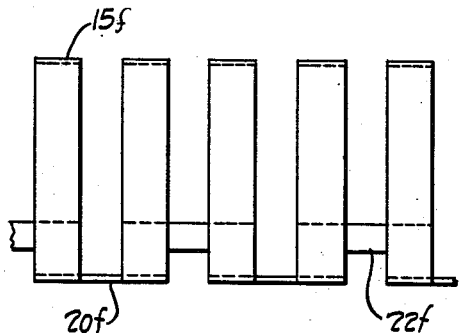
Figure 41:
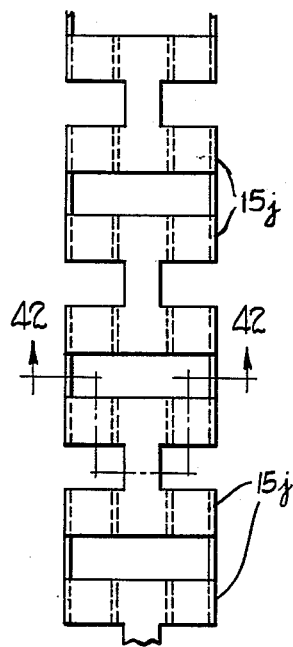
Figure 44:
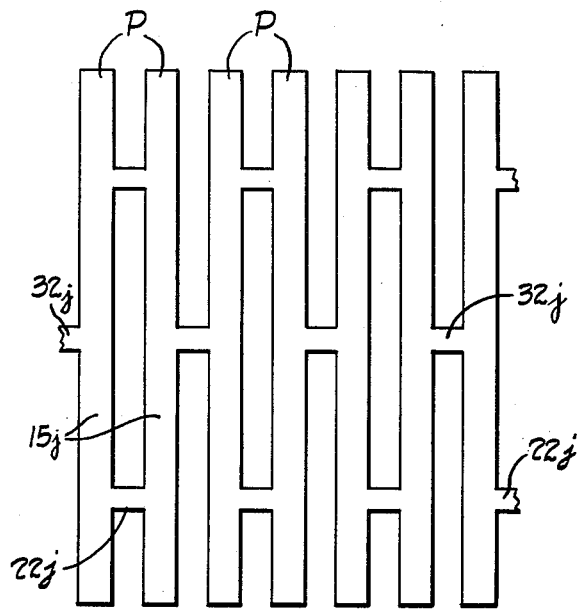

In FIGS. 25–28 is still another form in which the connections corresponding to 20 and 22 are made at the same side of the blank and, thus, at the same side of the carrier channel. The section of FIG. 26 being taken on an offset plane 26—26 of FIG. 25, shows both the connection 20f normal to the medial plane and the connection 22f parallel to the medial plane. The arrangement is readily apparent from the blank, the slots of which are all open at one side of the blank strip, while at the other side the bridging connections alternate between positions 22f connecting the ends of the parts 15f which form the U-shaped clamping members and positions 20f spaced inwardly therefrom for forming the bridging parts which are at right angles to the central plane.

FIGS. 29–32 illustrate another form in which the inturned and vertically parallel connections are positioned differently. The flexible ribbon connections, which are parallel with the central plane of the channel and with the flange to be gripped, are positioned outside of the inturned portion and are here designated 22g. The connecting ribbon portions, which are at right angles to the central plane and to the flange to be gripped, connect the inturned portions of the U-shaped gripping members at the zone 18g, in the manner appearing in the first-described form of FIGS. 8–12. The offset plane 30—30 of the section of FIG. 30, being taken as shown in FIG. 29, cuts through only one of each of the connecting bridging ribbons 22g and 20g. On the blank it will appear that the bridging members 22g are positioned a substantial distance farther inwardly from the ends of the portions 15g forming the U-shaped gripping members than are the connections 20g. Here, the 20g positions will connect the inturned portions 18g of the strips 15g forming the U-shaped gripping members, while the connections 22g are spaced further inwardly of the sides of the blank and, thus, become positioned at the sides of the U, as appears particularly clearly in FIGS. 29 and 31.

FIGS. 33–36 illustrate a form of the invention which embodies bridging connections having an arrangement and flexibility similar to that of FIGS. 8–12, but which have an additional feature of a flared, upwardly tapering opening at the throat or inner leading edges of the gripping members. This shape is shown particularly in FIG. 34, in which the U-shaped gripping members are shown as bent inwardly on an acute angle, preferably approximately 45°, for example, and are then bent into parallelism with the medial plane and the flange to be gripped, and then outwardly at their ends above these parallel gripping surfaces, and here are formed the connections 20h which are at right angles or normal to the central plane and flange to be gripped.

The parallel thin ribbon bridging connections, corresponding to those at 22 of FIGS. 8–12, are designated 22h. Thus, we have in effect adjacent pairs of gripping elements connected alternately by flexible bridging members 22h lying in a plane parallel with the central zone, and by connections 20h at right angles thereto. These latter bridging connections 20h are at the ends of the strips forming the U-shaped clamping members.

Referring to the blank of FIG. 36, the alternate connections are shown positioned near the sides of the blank and thus are beyond the portion of the strips 15h which form the U-shape and the flaring, sloping portions of the throat, indicated at 30 in FIG. 34.

This flared throat extending along the channel serves to facilitate pressing the covered channel onto the supporting flange.

FIGS. 37–40 illustrate still another modification in which the parallel gripping surface connections at the inner ends of pairs P of the U-shaped clamping members are arranged as they were in the first-described form in FIGS. 8–12, and, accordingly, are here designated 22i. The connection between the pairs of U-shaped members is somewhat different, being at the top or arch of the U, as indicated at 32i. The offset plane 38 on which the section of FIG. 38 is taken, is thus shown as intersecting two parallel connections 22i, and one of the single bridging members 32i at the top or middle of the arches thus connected. The blank of FIG. 40 may be very readily compared to FIG. 12, the connections 32i between pairs of members 15i being at the middle portion of the blank.

Figure 42:
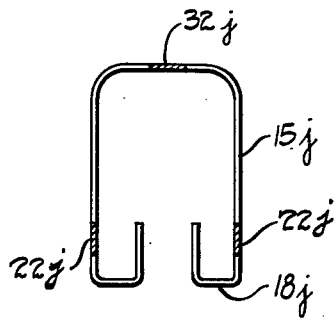
Figure 43:
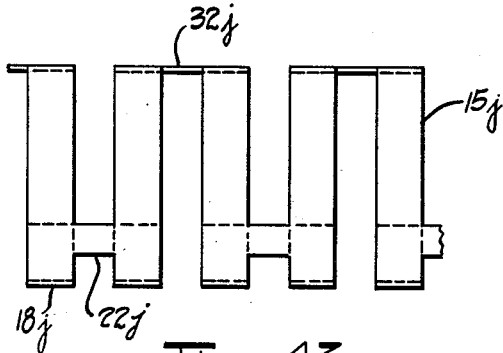

Another arrangement corresponding to that just described is shown in FIGS. 41–44, and here the pairs P are again connected at the upper portion of the arch by the thin bridging members 32j, while the parallel bridging members, i.e., parallel to the middle plane and the flange to be gripped, are formed inwardly from the ends of the U-shaped gripping members and, thus, are positioned as appears particularly in FIGS. 42 and 43 and there designated 22j. Thus, as shown on the blank of FIG. 44, the members 22j connect the members 15j of a pair P at a considerable distance inwardly from the ends of the U-forming strips 15j.

It will be noted that in all of these forms shown and described in this application the U-shaped clamping members are substantially evenly spaced a distance approximately equal to the width of the strips forming the individual U-shaped members, and that the thin, flexible bridging connections in each case are of comparable width, or in some instances, slightly narrower than the width of the cross strips forming the clamping members.

It may be noted that all of the ribbon-like bridging connections are shown as being flat before bending, but obviously they may be crimped or arched slightly, if desired, for even greater flexibility, as of pairs, for example at 22 in FIG. 8. Although this has been found to be unnecessary with any of the forms shown, such a crimping has been used and is illustrated in FIG. 11 of a copending application of Steck et al., Ser. No. 81,120 filed January 6, 1961, now Patent No. 3,108,338.

In the arrangement shown in FIGS. 3 and 8–12, for example, the flexing in the direction of the medial plane occurs at the open or throat side of the channel, and this feature lends itself well to the fitting into sharp corners and short-radius curves on the flange, as shown in FIG. 3. In all instances, the flexing transversely, i.e., across the medial plane, occurs by bending similar narrow ribbon bridges across their thin dimension. It will also be seen that all of these forms illustrated embody one basic or common principle, namely, that the interconnecting of the U-shaped gripping members with the longitudinally extending ribbon-like bridges provides for permitting readily flexing the channel in the general plane of its medial plane and of the carrier flange to which it is to be fitted, and for likewise permitting lateral flexing or curving for offsets of the flange, as illustrated in FIGS. 4 and 5. This flexing will occur without disturbing the external appearance of the covering material or unduly distorting the sealing portion mounted on the flexible carrier channel. Incidentally, the channel may be made in any suitable lengths or sections; the blanks may be stamped or cut in intermittent steps or in continuous fashion; and in production the covering may be placed on the channel in a continuous, longitudinal motion.

The carrying channel holds execeptionally firmly when in position on thick or thin flanges, and the assembly is thus strongly resistant to being disturbed or removed.

The structure and its covering, trim, or seal in various forms may be very economically produced in large quantities and its characteristics and features are improved over previous carrier channel means and assemblies, in all respects, such as convenience of installation, effective sealing, appearance, etc.

As previously indicated, a preferred embodiment meeting all the conditions and requirements to the best advantage as presently known is that illustrated in FIGS. 8–12.

Having thus described my invention, what I claim is:

1. An elongated, flexible, flange-gripping, carrier member for trim, weather seals, and the like, said carrier member being a strip of thin, spring metal having a generally channel-shape in transverse profile that provides a pair of spaced side walls and an open throat side therebetween for receiving a flange to be gripped between said side walls, and said channel-shaped strip comprising a succession of longitudinally spaced and aligned, parallel, transversely extending, gripping sections of corresponding transverse profile and dimensions integrally connected one-to-another over the length of the strip only by a succession of connections of thin, substantially planar, bridging bands of said spring metal, there being at least one such bridging band in the connection between each one of the adjacent gripping sections, the plane of each bridging band in alternate connections between gripping sections along the strip being oriented substantially parallel to one another and the plane of each bridging band in the remaining connections between gripping sections being oriented substantially perpendicular to the plane of the bridging bands in said alternate connections whereby the strip may bend at any of said alternate connections to conform the strip to a curve lying in a first plane perpendicular to the planes of the bridging bands in said alternate connections and may bend at any of said remaining connections to conform the strip to a curve lying in a second plane perpendicular to said first-named plane.

2. A carrier member according to claim 1 in which said gripping sections have opposite edge portions that are turned inwardly toward each other and then farther inwardly to provide inner, laterally spaced, parallel, flange-gripping portions disposed within said channel-shaped profile between the side walls thereof.

3. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, and a trim material extends about the exterior of the carrier member over the length thereof, into the open throat thereof, and over said opposed, flange-gripping portions so as to be clamped between said flange-gripping portions and a mounting flange grippingly engaged thereby.

4. A carrier member according to claim 1 in which said gripping sections have opposite edge portions that are turned inwardly toward each other at said open throat side of the strip, the bridging bands of at least some of said connections directly connecting pairs of adjacent gripping sections only at the inwardly turned edge portions thereof.

5. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, the bridging bands of at least some of said connections directly connecting pairs of adjacent gripping sections only at said flange-gripping portions thereof.

6. A carrier member according to claim 1 in which said gripping sections have opposite edge portions that are turned inwardly toward each other at said open throat side of the strip, the bridging bands of all of said connections directly connecting pairs of adjacent gripping sections only at or closely adjacent the open throat side thereof, and the bridging bands of at least some of said connections directly connecting pairs of adjacent gripping sections only at the inwardly turned edge portions thereof.

7. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, the bridging bands of all of said connections directly connecting pairs of adjacent gripping sections only at said inwardly and further inwardly turned portions thereof.

8. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, said further inwardly turned edge portions then being turned outwardly to form oppositely directed inner edge portions extending outwardly toward said side walls from said flange-gripping portions.

9. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, said further inwardly turned edge portions then being turned outwardly to form oppositely directed inner edge portions extending outwardly toward said side walls, the bridging bands of at least some of said connections directly connecting pairs of adjacent gripping sections only at said oppositely directed inner edge portions.

10. A carrier member according to claim 1 in which said gripping sections have opposite edge portions turned inwardly toward each other and then further inwardly to provide inner, laterally spaced, parallel, flange-gripping portions disposed within said channel-shaped profile between the side walls thereof, said further inwardly turned edge portions then being turned outwardly to form oppositely directed inner edge portions extending outwardly toward said side walls from said flange-gripping portions, the bridging bands of at least some of said connections directly connecting pairs of adjacent gripping sections only at said oppositely directed inner edge portions, and the bridging bands of the rest of said connections directly connecting pairs of adjacent gripping sections only at said flange-gripping portions thereof.

11. A carrier member according to claim 1 in which said gripping sections have opposite edge portions turned inwardly through an angle substantially greater than 90° to provide an inwardly converging throat opening, and then being turned further inwardly to provide spaced, parallel, inwardly directed flange-gripping portions between the side walls of the carrier member.

12. A carrier member according to claim 1 in which said gripping sections have opposite edge portions turned inwardly to provide inner, laterally spaced, parallel, flange-gripping portions disposed within said channel-shaped profile between the side walls thereof, the bridging bands of at least some of said connections directly connecting pairs of adjacent gripping sections only at the side thereof opposite said open throat side.

13. A carrier member according to claim 1 in which said gripping sections have opposite edge portions turned inwardly to provide inner, laterally spaced, parallel, flange-gripping portions disposed within said channel-shaped profile between the side walls thereof, the bridging bands of at least some of said connections directly connecting pairs of adjacent gripping sections only at the side thereof opposite said open throat side, and the bridging bands of the rest of said connections directly connecting pairs of adjacent gripping sections only at or closely adjacent the open throat side thereof.

14. The combination of a carrier member according to claim 1, said carrier member having a covering layer of elastomeric cushioning material extending about the exterior of the channel-shaped strip over the length thereof, and a resilient sealing member of the same elastomeric material integrally connected to said covering layer of the carrier member, said sealing member being disposed laterally to one side of the carrier member and extending parallel thereto over the length thereof.

15. The combination of a carrier member according to claim 1 in which said gripping sections have opposite edge portions that are turned inwardly toward each other and then further inwardly to provide inner, laterally spaced, parallel, flange-gripping portions disposed within said channel-shaped profile between the side walls thereof, said carrier member having a covering layer of elastomeric cushioning material extending about the exterior of the channel-shaped strip over the length thereof, and a parallel, resilient, sealing member of the same elastomeric material integrally connected to said covering layer of the carrier member, said sealing member being disposed laterally to one side of said carrier member over the length thereof.

16. An elongated flexible spring metal carrier for trim, weather seals and the like, comprising a plurality of longitudinally spaced and aligned, parallel, transversely extending gripping elements of like generally U-shaped transverse configuration and dimension integrally connected one to another over the length of the carrier only by a succession of thin substantially planar relatively narrow bridging bands, there being at least one such bridging band between each one of the adjacent gripping elements, the plane of each bridging band between a first pair of adjacent gripping elements being orientated substantially parallel to a first plane extending longitudinally of said carrier to facilitate bending of said carrier about an axis extending transversely of said carrier and parallel to said first longitudinally extending plane, the plane of each bridging band between a second pair of adjacent gripping elements being orientated substantially parallel to a second plane extending longitudinally of said carrier generally normal to said first longitudinal plane to facilitate bending of said carrier about an axis extending transversely of said carrier and parallel to said second plane.

References Cited by the Examiner

UNITED STATES PATENTS

| 763,303 | 6/04 | Mayers | 24—259 |
| 1,867,313 | 7/32 | Gaines | 20—69 X |
| 2,043,700 | 6/36 | Hamm | 20—69 |
| 2,290,842 | 7/42 | Bush | 296—44.5 |
| 2,536,382 | 6/51 | Matchett | 24—81 X |
| 2,908,949 | 10/59 | Frehse | 20—69 |
| 2,986,793 | 6/61 | Bright | 20—69 |

FOREIGN PATENTS 485,469  10/53  Italy.

HARRISON R. MOSELEY, *Primary Examiner.*